UNITED STATES PATENT OFFICE.

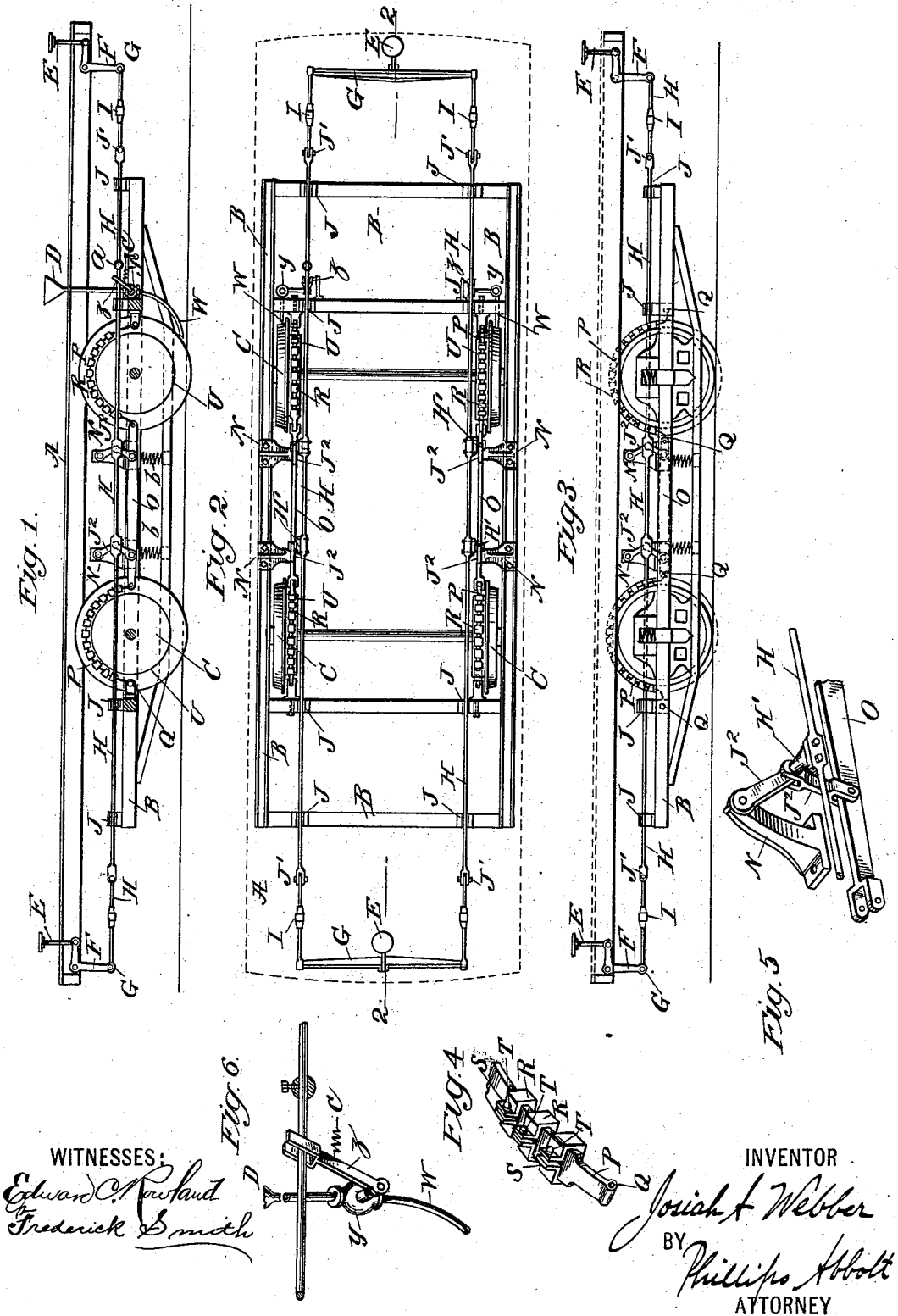

JOSIAH A. WEBBER, OF BROOKLYN, NEW YORK.

BRAKE FOR RAILWAY-CARS.

SPECIFICATION forming part of Letters Patent No. 530,912, dated December 11, 1894.

Application filed February 3, 1894. Serial No. 498,965. (No model.)

*To all whom it may concern:*

Be it known that I, JOSIAH A. WEBBER, a citizen of the United States, and a resident of Brooklyn, in the county of Kings and State of New York, have invented certain new and useful Improvements in Car-Brakes, of which the following is a specification.

The object of my invention is to provide a powerful, simple and easily operated brake, which, while applicable to rolling stock generally, is especially intended for use on street cars, by whatever power propelled, whereby they can be more quickly stopped, than by the use of any form of brake known to me.

The characteristic features of my invention, generally stated, consist in an arrangement of toggle arms or equivalent devices coacting with rods, whereby they are actuated from the platform of the car in any suitable manner in combination with braking devices of any preferred construction, which may be friction straps upon which brake shoes are fastened and which are attached to a bar actuated by the toggle arms, in such manner as to bring the brake shoes in contact with the tread of the wheel, including its flange if desired, or with the surface of a supplemental braking surface, made in the form of a flange or annular ledge attached to or formed on the side of the wheel, whereby the braking action is secured.

An important, but not an essential feature of my invention is that the brakes may be and preferably are applied directly on the top of the wheel or on the top of the supplemental friction surface as the case may be, whereby much greater area of surface of the brake shoe or shoes can be secured than as such devices have been heretofore constructed. This is especially important in case of emergencies, when the car must be stopped in the shortest possible time and space. Certain mechanically equivalent devices may be substituted for those shown by me, but the above is a general description of the construction.

In the drawings hereof, Figure 1, illustrates a sectional view of the parts of a street car, which are involved in the invention, taken on the line 2, 2 of Fig. 2. Fig. 2, illustrates a plan of that which is shown in Fig. 1. Fig. 3, illustrates a side elevation of a modified construction. Fig. 4, illustrates a detail in perspective of the brake shoes on one of the friction straps. Fig. 5, illustrates a detail of the toggle arms and adjacent parts. Fig. 6, illustrates a detail of the devices for operating the sand box.

In Fig. 1, the braking shoes are shown as applied to a supplemental friction surface, i. e., an annular flange or ledge formed on or attached to the wheel.

In Fig. 3, the parts are so arranged as to apply the brakes to the tread and flange of the wheel.

I illustrate the two forms so as to show that my invention is adapted to various constructions, and to the application of the brakes to the tread of the wheel including the flange if desired, or to a supplemental friction surface as may be preferred.

A indicates the frame of the car; B, the frame of the truck; C, C, &c., the wheels; D, the sand box.

E, E are pedals, one on each platform. They connect with bell crank levers, F, F, pivoted under the platforms to any suitable part of the structure.

G, G are cross bars, preferably, for the sake of stiffness and strength, made in the form of small trusses. They are pivoted to the lower arm of the bellcranks respectively, and at their ends are connected to side rods H, H, which extend from cross-bar to cross-bar, and are provided with turn buckles I, I, I, I, whereby lost motion and wear may be taken up and adjustments effected. The rods slide through bearings J, J, J, J, preferably located upon the truck frame, although in certain constructions and in certain kinds of car, they may be upon the car body, and these rods preferably have joints in them as at J', J', J', J', so as to compensate for the rocking motion of the car, if any. The upper member of each set of toggles J² is pivoted to or otherwise engaged with the upper end of a bracket N, which is bolted to the truck frame, there being a bracket for each set of toggles, and the lower member of each pair of toggles engages with a horizontal bar O, there being one such bar on each side of the car, to the ends of which friction straps P are attached, as at Q. The rods H, H are provided with strong pins H', opposite the knuckle of each pair of toggles, and these pins pass through the meeting ends of the toggles and form their axis.

The rods H, H are preferably thickened and made additionally strong at the point where the pins H' are bolted to them, so that this part of the structure shall be sufficiently rigid and strong to withstand the considerable strain to which it is subjected.

R, R, &c., are the friction shoes. They may be applied to and held upon the metallic friction straps as shown in Fig. 4, i. e., each shoe is provided with upwardly extending lips S, S, through which a bolt T passes, and the straps are of such width that they will but just pass through the openings in the shoes, and when they are properly placed on the straps, the bolts T are screwed firmly up and the shoes are thus securely and rigidly held on the straps. Any other method of constructing these details may be employed.

U, U are supplemental brake surfaces, ledges or flanges formed on or attached to the side of the wheels, upon which the friction shoes may act instead of bearing on the tread of the wheels.

W, W are the delivery chutes from the sand boxes.

Y, Y are valves in the chutes operated respectively by levers Z, Z, which are moved and the flanges consequently opened, when the balls or projections $a$ on the rods H, H come in contact with their upper bifurcated ends, which straddle the rods H. The balls or equivalent devices $a$ should be made adjustable on the rods H.

$b, b$ are retractile springs which return the parts to their normal position.

$c, c$ are springs which return the levers Z, Z to their normal position.

In Fig. 3, as above stated, I show a construction in which the brake shoes extend over the treads of the wheels including their flanges, thus showing that my invention is adapted both to the application of the braking devices upon the threads of the wheels including their flanges if desired, or upon the supplemental braking surfaces, as may be preferred; and I wish here to say that a single solid brake shoe may be substituted for the friction straps and shoes if preferred.

The operation is as follows: When the driver or the motor man, as the case may be, wishes to stop the car, he applies his foot to the pedal which is on the platform where he stands, and depresses it. This action rocks the bell-crank and pulls or pushes, as the case may be, the truss-like cross-bars G, G and the rods H, H in such manner that all the toggles are straightened on both sides of the car. The horizontal bars O, O are consequently depressed and the brake shoes, whatever their construction may be, are brought with great force downwardly upon the supplemental brake surfaces, or upon the tread or tread and flange of the wheels, as the case may be. Thus they are stopped, and the rapidity of the stoppage will depend upon the power which the operator applies through the pedal, and when there is occasion to stop the car as quickly as possible to avoid accident, then the driver or motor man throws his whole weight forcibly upon the pedal; this great pressure moves the rods H, H farther than they are moved when stopping the car ordinarily, and the balls or equivalent devices $a, a$ are so adjusted on the rods H, H and the adjustment of the entire apparatus is such that when this excessive movement takes place they, the balls, are brought in contact with the levers Z, Z and the flanges in the sand ducts are thus opened and sand is aplied to the track immediately in front of the wheels, so that its effect is instantly felt in stopping the car. The spring $b, b$ return the parts to their normal condition as soon as pressure on the pedal is removed.

I desire to call especial attention to two features of my invention. One is, that under both forms of my invention, the brake shoes or braking surfaces, whichever may be employed, are caused to act directly on top of the tread of the wheel or upon the top of a supplemental friction surface, if such be used. Consequently the area or extent of the brake shoes can be made substantially equal to one half of the entire tread or the supplemental braking surface. This, I believe is a very important feature, because, as brakes have heretofore been constructed, they have been limited to a very much less area than I can employ.

The second point, to which I desire to call attention is the following: In my construction, no additional act is required on the part of the motor man or driver to apply sand in the event of an accident. When an emergency arises, it is very seldom that the operator remembers to work the lever or pull the cord to let on sand, as provided in other devices known to me, because it is an unusual thing for him to do so, and therefore, it not being his practice, and being disturbed by the presence of the emergency, he almost always forgets to operate such devices and moreover, he is compelled in all such constructions known to me, to first put on his brake full force, then drop it and operate the sand box lever, and during all this time the car has progressed and in all probability the accident occurred before he gets any sand on the track whatever. In my construction, the motor man or driver unconsciously applies all his weight upon the pedal, the moment he sees that an accident is imminent, because his constant practice and experience has taught him that this is the way to stop his car, and that the more the pressure the quicker it will stop. Consequently, in an almost automatic fashion, he throws his entire weight on the pedal, which, as above stated, occasions the opening of the valve in the sand duct, so that the sand is applied to the track, and it will be especially noticed that it is deposited directly in front of the wheel, where it will immediately act, and not as in most prior constructions, several feet from the wheel.

In the drawings, I show two sets of toggles upon the side of the car. It will be evident to those who are skilled in this art, that one pair only need be used on each side of the car. If so, however, the bars O should be made sufficiently strong as not to spring under the considerable pressure brought to bear upon them.

Other suitable devices may be substituted for the pedals. Equivalent devices may be substituted for the toggles. The rods which operate the toggles may be differently arranged, and various other modifications in the details may be made without departing from the essentials of my invention. I prefer, however, constructions substantially such as shown, because it is simple and efficient and very powerful.

I claim—

1. The combination of a longitudinally movable rod, a horizontal bar connected with friction straps having brake shoes, means between the movable rod and the horizontal bar for depressing the latter when the former is moved, and means accessible to the operator for longitudinally moving the rod, substantially as set forth.

2. The combination of a longitudinally movable rod, a horizontal bar connected with friction straps having brake shoes, toggle arms supported at one end by the frame of the truck and engaging with a horizontal bar at their other end, and by a longitudinally moving rod at their knuckle, and means accessible to the operator for longitudinally moving the rod, substantially as set forth.

3. The combination of a longitudinally movable rod, a horizontal bar connected with friction straps, having brake shoes, toggle arms supported at one end by the truck frame and engaging with a horizontal bar at their other end and with a longitudinally movable rod at their knuckle, means accessible to the operator for longitudinally moving the rod, and friction surfaces or ledges on the sides of the wheels against which the brake shoes act, substantially as set forth.

4. The combination of a longitudinally movable rod, a horizontal bar connected with friction straps having brake shoes, means between the movable rod and the horizontal bar for depressing the latter when the former is moved, a lever located near the said rod, which is adapted to actuate the valve of the sand box, and a stop on the rod, which engages with the said lever, substantially as set forth.

5. The combination of a longitudinally movable rod, and horizontal bar, toggle arms supported by the truck frame and engaging with the horizontal bar at their other end and with the longitudinally movable bar at their knuckle, means accessible to the operator for longitudinally moving the rod and friction shoes connected with said horizontal bar, substantially as set forth.

6. The combination of a longitudinally movable rod, a horizontal bar brake shoes connected with said horizontal bar, means between the movable rod and the horizontal bar for depressing the latter when the former is moved, a lever located near the said rod which actuates the valve of a sand box, and a stop on the rod which engages with said lever, substantially as set forth.

7. The combination of a longitudinally movable rod, a horizontal bar, means operated by the driver or motorman for longitudinally moving said rod, devices connecting the rod and the bar, friction devices connected with the bar and operated by it, which bear upon the top of the tread of the wheel or on the top of a supplemental braking surface, as the case may be, substantially as set forth.

Signed at Castleton, in the county of Richmond and State of New York, this 25th day of January, A. D. 1894.

JOSIAH A. WEBBER.

Witnesses:
JAMES LANGAU,
EDWIN S. LAWRENCE.